United States Patent
Devermann et al.

(10) Patent No.: US 11,201,519 B2
(45) Date of Patent: Dec. 14, 2021

(54) METHOD FOR ELECTRICALLY CONTACT-CONNECTING A WINDING OF AN ELECTRICAL MACHINE TO A PRINTED CIRCUIT BOARD

(71) Applicant: Robert Bosch GmbH, Stuttgart (DE)

(72) Inventors: Thomas Devermann, Achern-Fautenbach (DE); Asli Arslan-Huerst, Karlsruhe (DE); Harald Merz, Sinzheim (DE); Ilya Kuperberg, Karlsruhe (DE); Michael Soellner, Lichtenau (DE); Peter Beck, Budapest (HU); Ralf Lehmann, Oberkirch (DE); Wolfgang Glueck, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 16/341,117

(22) PCT Filed: Sep. 20, 2017

(86) PCT No.: PCT/EP2017/073750
§ 371 (c)(1),
(2) Date: Apr. 11, 2019

(87) PCT Pub. No.: WO2018/069011
PCT Pub. Date: Apr. 19, 2018

(65) Prior Publication Data
US 2020/0195079 A1     Jun. 18, 2020

(30) Foreign Application Priority Data

Oct. 14, 2016   (DE) ..................... 10 2016 220 125.5

(51) Int. Cl.
*H02K 3/52*    (2006.01)
*H02K 15/00*   (2006.01)

(52) U.S. Cl.
CPC ......... *H02K 3/522* (2013.01); *H02K 15/0062* (2013.01); *H02K 15/0068* (2013.01); *H02K 2203/03* (2013.01)

(58) Field of Classification Search
CPC .. H02K 5/24; H02K 5/16; H02K 7/16; H02K 11/00; H02K 5/167; H02K 1/18; H02K 3/52; H02K 5/15
See application file for complete search history.

(56) References Cited

U.S. PATENT DOCUMENTS 7,053,517 B2 * 5/2006 Suzuki ................... H02K 3/325
                                                    310/257
9,461,518 B2 * 10/2016 Hata ....................... H02K 5/15
(Continued)

FOREIGN PATENT DOCUMENTS

| CN | 106026433 A | 10/2016 |
| DE | 69906915    | 12/2003 |
| DE | 102010029982 | 12/2011 |

OTHER PUBLICATIONS

International Search Report for Application No. PCT/EP2017/073750 dated Dec. 12, 2017 (English Translation, 2 pages).

*Primary Examiner* — Tran N Nguyen
*Assistant Examiner* — Leda T Pham
(74) *Attorney, Agent, or Firm* — Michael Best & Friedrich LLP (57) ABSTRACT

The invention relates to a method (100) for electrically contact-connecting a winding (40) of an electrical machine (1) to a printed circuit board (92), wherein the electrical machine (1) has an armature (10) with a large number of teeth (20), wherein at least one winding (40), which is formed by an electrical conductor (42), is formed on one of the teeth (20). The method comprises the following steps: routing (110) the conductor ends (45) of the electrical conductor (42) out of the armature (10) in the axial direction
(Continued)

of the electrical machine (1), shortening (115) the conductor ends (45) to the same length, routing (120) the conductor ends (45) through in each case one passage opening (67) in a centring element (66), wherein the centring element (66) has a centring means (69) which centres and orients in parallel the routed-through conductor ends (45), wherein the routed-through conductor ends (45) emerge from the centring element (66), routing (125) the conductor ends (45) through in each case one passage opening (73) in a sealing element (72), wherein the routed-through conductor ends (45) emerge from the sealing element (72), inserting (130) the centring means (69) into in each case one passage opening (73) in a sealing element (72), arranging (135) the sealing element (72) at least partially within a passage opening (6) in a housing element (5), and electrically contact-connecting (140) the conductor ends (45) to the printed circuit board (92).

28 Claims, 6 Drawing Sheets (56) References Cited

U.S. PATENT DOCUMENTS

| | | | |
|---|---|---|---|
| 2008/0088209 A1* | 4/2008 | Ryu | H02K 7/06 |
| | | | 310/49.01 |
| 2014/0167534 A1* | 6/2014 | Hata | H02K 5/15 |
| | | | 310/49.01 |
| 2015/0222156 A1 | 8/2015 | Tomizawa et al. | |

* cited by examiner

METHOD FOR ELECTRICALLY CONTACT-CONNECTING A WINDING OF AN ELECTRICAL MACHINE TO A PRINTED CIRCUIT BOARD

BACKGROUND OF THE INVENTION

The invention relates to a method for the electrical contacting of a winding of an electric machine, and an electric machine which is produced by means of the method.

An electric motor comprising an armature, which has a plurality of teeth and a plurality of grooves, is already known. It is also known that an electrical conductor, which forms a winding, is electrically isolated from the armature by an insulating means.

SUMMARY OF THE INVENTION

The method according to the invention for establishing electrical contact between a winding of an electric machine and a printed circuit board has the advantage that simplified electrical contacting is possible whilst still ensuring the sealing of the housing element in which the printed circuit board is located. The electric machine has an armature with a plurality of teeth, wherein at least one winding, which is formed by an electrical conductor, is formed on one of the teeth. The method is characterized by the following method steps:

Leading the conductor ends of the electrical conductor out of the armature in the axial direction of the electric machine. In the case of multiple electrical conductors, all conductor ends of the electrical conductors are preferably led out.

Shortening the led-out conductor ends to the same length. Simpler arrangement is realized.

Leading the conductor ends through a respective through-opening of a centering element, wherein the centering element has a centering means which centers the conductor ends which are led through and aligns them in parallel. All conductor ends are preferably simultaneously guided through a respective through-opening. The leading-through is achieved in particular by an axial displacement of the centering element in the direction of the armature. During the axial displacement, the conductor ends protruding axially from the armature are introduced into the through-openings and led through these. The conductor ends which are led through emerge from the centering element at the end lying opposite the introduction point.

Leading the conductor ends through a respective through-opening of a sealing element, wherein the conductor ends which are led through emerge from the sealing element. The leading-through is achieved in particular by an axial displacement of the sealing element in the direction of the armature. During the axial displacement, the conductor ends protruding axially from the armature, in particular aligned in parallel by the centering element, are introduced into the through-openings and led through these. The conductor ends which are led through emerge from the sealing element.

Introducing the centering means into a respective through-opening of a sealing element.

Arranging the sealing element at least partially within a through-hole of a housing element.

Establishing electrical contact between the conductor ends and the printed circuit board, whereby the electrical contact between the winding and the printed circuit board is produced.

An advantageous method step is distinguished by at least partially removing the insulation at the conductor ends, wherein in particular the removal of the insulation at the conductor ends is carried out by rotating blades or laser. The contact with the printed circuit board is simplified by the removal of the insulation.

It is particularly advantageous that the electrical contact between the printed circuit board and the conductor ends is established by soldering, in particular by means of a selective soldering process, preferably a multi-wave process. This enables an electrical connection to be produced in a simple manner, which connection also withstands mechanical loads.

It is furthermore advantageous to produce the electrical contact by means of one of the following processes: mini-wave, manual soldering, laser soldering or inductive soldering.

It is advantageous that the attachment of the armature to a housing element is carried out in particular by means of a screw-fastening procedure.

An advantageous method step is distinguished by leading the conductor ends through at least one respective sealing means of the sealing element. The through-opening of the sealing element advantageously extends through the sealing means.

A particularly advantageous method step is distinguished by leading the conductor ends through at least one respective through-opening of a second centering element. It is furthermore advantageous that the second centering element has a centering means which centers the conductor ends which are led through and aligns them in parallel. The conductor ends, after they are led through, project out of the second centering element.

The electric machine according to the invention has at least one electrical conductor and an armature with a plurality of teeth. The electric machine furthermore has at least one winding, which is formed by the at least one electrical conductor. A centering element with at least two through-openings and a sealing element with at least two through-openings are furthermore part of the electric machine. The electrical conductor has two conductor ends which each extend through a through-opening of the centering element and the sealing element. The electric machine is characterized in that the centering element has a base body and at least two centering means. Each of the through-openings of the centering element extends through the base body and one of the centering means. The sealing element has a base body and at least two sealing means. Each of the through-openings of the sealing element extends through the base body and one of the sealing means. The centering means are each arranged at least partially within one of the through-openings of the sealing element. The conductor ends extending through the sealing element and the centering element project out of these. The conductor ends are electrically connected to a printed circuit board by soldering, in particular at their ends.

It is particularly advantageous that the centering element and the sealing element each have two or more, in particular six, through-openings. It is furthermore advantageous that two or more, in particular six, conductor ends of one or more, in particular three, electrical conductors extend through a separate respective through-opening of the centering element. Two or more, in particular six, conductor ends of one or more, in particular three, electrical conductors extend through a separate respective through-opening of the sealing element. It is moreover advantageous that centering means are formed according to the number of through-openings of the centering element, wherein the centering means are at least partially arranged in one of the through-openings of the sealing element in each case. The centering means guide the conductor ends extending in the through-openings of the sealing element. The conductor ends project out of the sealing means.

It should be seen as advantageous that the centering element and the sealing element each have two or more through-openings. This enables the winding conductor to be led out of the armature in a simple manner. Sealing of the housing is furthermore possible despite the multiplicity of electrical conductors with only one centering element and one sealing element.

It is particularly advantageous that the centering means has a tubular region. The tubular region enables the conductor end arranged therein to be centered and guided with respect to the through-openings of the sealing element. The attachment of the sealing element is simplified.

It is advantageous that the centering means is conically formed at its free end. The conical form simplifies the introduction of the centering means into the through-openings of the sealing element, for example.

It should be seen as advantageous that the through-opening of the centering element has a funnel-shaped region. Part of the funnel-shaped region of the through-opening is formed within the centering means. The funnel-shaped region simplifies the introduction of a conductor end into the through-opening of the centering means.

It is advantageous that the through-opening of the sealing element has a funnel-shaped region. The funnel-shaped region simplifies the introduction of the conductor end and the centering means of the centering element into the through-opening of the centering means.

It is particularly advantageous that the through-opening of the sealing element has a first radius and a second radius. The first radius corresponds substantially to the radius of the centering means of the centering element and the second radius is smaller than the first radius. The second radius preferably corresponds substantially to the radius of the electrical conductor. In particular, the second radius is slightly greater than the radius of the electrical conductor. The best possible sealing is achieved.

It is advantageous that at least one, in particular circumferential, sealing lip is formed in the inner circumference of the through-opening of the sealing element, in particular in the inner circumference of the through-opening within the sealing means. The sealing lip simplifies the leading-through of the conductor end and improves the sealing by the sealing element.

It is particularly advantageous that the base body of the sealing element has at least one circumferential sealing lip on its outer circumference. The sealing lip improves the sealing of the through-opening of the housing element by means of the sealing element.

It is advantageous that the sealing lips on the base body of the sealing element are at an axial spacing from the sealing lips in the inner circumference of the through-opening of the sealing element. Tolerance compensation is enabled.

It should be seen as advantageous that a housing with a through-opening is provided. The through-opening is formed to correspond to the outer circumference of the base body of the sealing element.

It is advantageous that a guide means is provided, which is formed such that it directs the electrical conductor out of an armature of the electric machine in the axial direction.

It is particularly advantageous that a second centering element is provided, which has a through-opening with, in particular, a funnel-shaped region, wherein the electrical conductor extends within the through-opening. The second centering element enables simplified alignment of conductor ends relative to the printed circuit board.

It should be seen as advantageous that a printed circuit board is provided, wherein the printed circuit board has a solder bore in which one end of the electrical conductor is arranged, in particular soldered, after assembly.

The electric machine is preferably part of a fan, in particular for cooling an internal combustion engine or an electric drive motor, of an HVAC blower or a coolant pump.

BRIEF DESCRIPTION OF THE DRAWINGS

Exemplary embodiments are illustrated in the figures and explained in more detail in the description below. The figures show.

DETAILED DESCRIPTION

Figure 1:
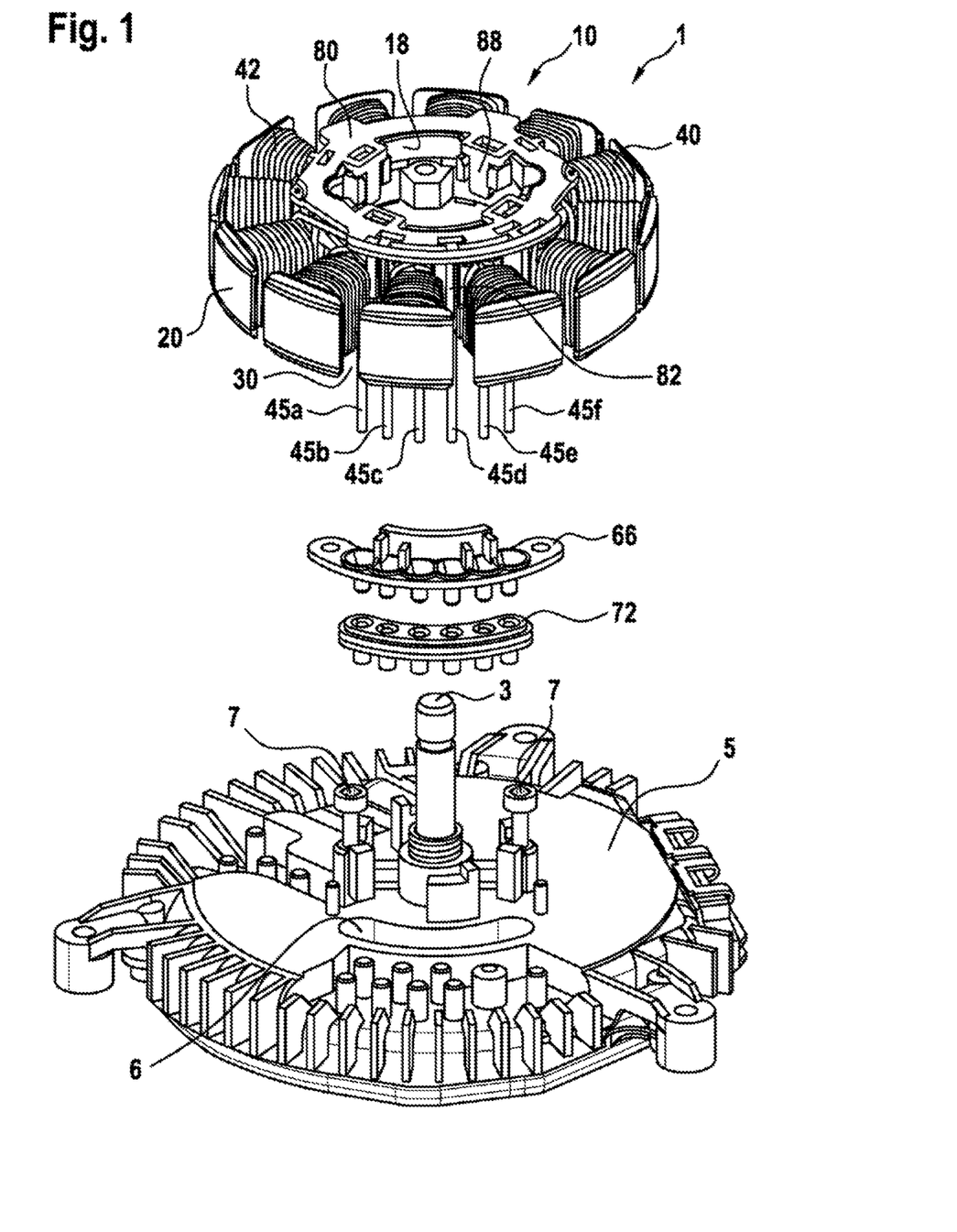
FIG. 1 part of an electric machine according to the invention.

FIG. 1 shows part of an electric machine 1. The electric machine 1 comprises an armature 10, a shaft 3, a housing element 5, a first centering element 66, a sealing element 72 and at least one electrical conductor 42. The armature 10 is a component part of the stator of the electric machine 1.

The electric machine 1 furthermore comprises a rotor. The rotor is not shown for the sake of clarity. According to FIG. 1, the electric machine 1 is formed in particular as an external rotor, which means that the rotor rotates about the armature 10. The rotor is rotatably mounted on the shaft 3. The shaft 3 is fixedly connected to the housing element 5. According to a further development of the invention, the rotor 3 is fixedly connected to the shaft 3 and the shaft 3 is mounted to be rotatable relative to the housing element or relative to the armature 10.

The armature 10 is fixedly connected to the housing element 5 by means of screws 7. The housing element 5 has receiving means with threads for fastening the screws 7.

The armature 10 has a plurality of teeth 20 and an, in particular substantially annular, armature base body 18. The teeth 20 are separated from one another in the circumferential direction by grooves 30. The armature base body 18 has an outer circumferential surface on which the teeth 20 are formed. The armature base body 18 and the teeth 20 are formed in particular by a laminated core 12.

According to FIG. 1, the electric machine 1 has, by way of example, three electrical conductors 42. Wound around a tooth 20, an electrical conductor 42 forms a winding 40.

Each tooth 20 preferably has at least one winding 40, which is formed by an electrical conductor 42. According to FIG. 1, the armature 10 is formed for an electrically commutated motor with three phases. One of the electrical conductors 42 preferably forms multiple windings 40 on multiple teeth 20. By way of example, the armature 10 shown in FIG. 1 has twelve teeth 20. Each of the three electrical conductors 42 is wound around four teeth 20 and therefore forms a respective winding 40 on four teeth 20. A current flow through the electrical conductor 42 results in the generation of a magnetic field, which results in a rotary movement of the rotor of the electric machine 1. The rotor has magnets, ferrite elements or elements which cooperate with the magnetic field generated by the current flowing through the windings 40. The cooperation brings about a rotary movement of the rotor relative to the armature 10.

Figure 2:
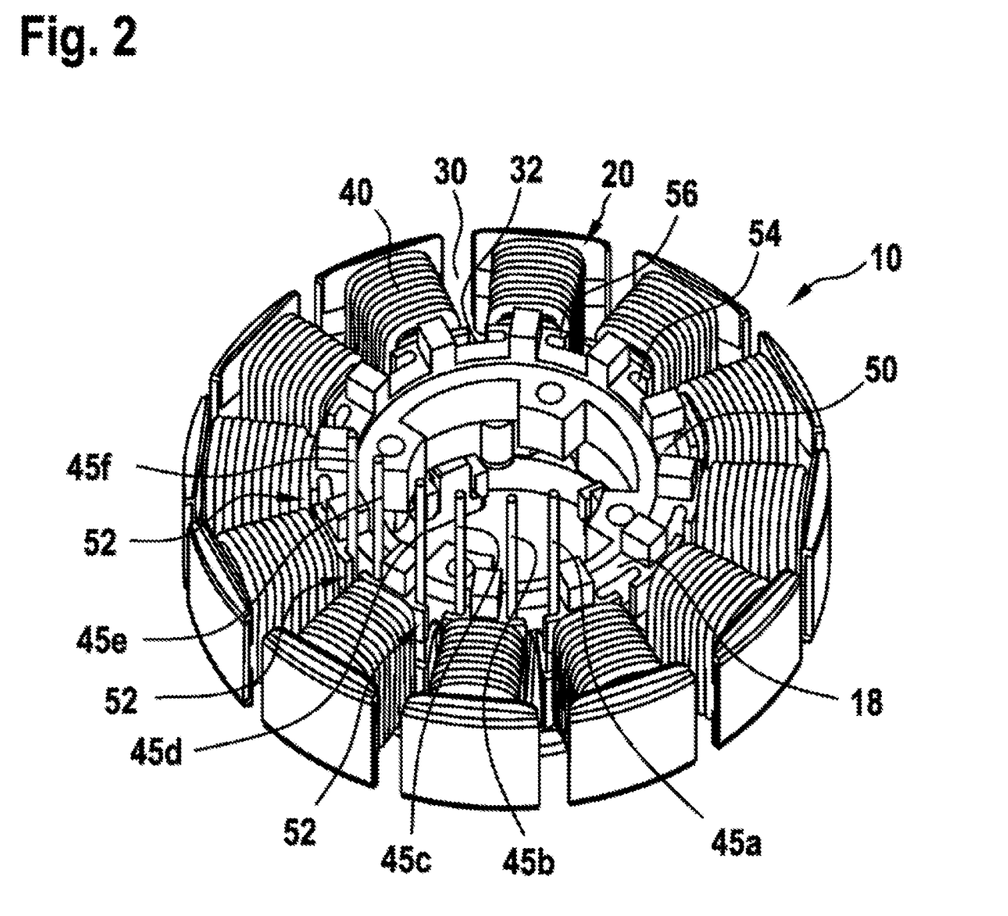
FIG. 2 the side of the armature which is directed towards the housing element in the assembled state, FIG. 3 the first centering element, the sealing element, the optional second centering element, the printed circuit board and a section of the housing element, FIG. 4 the underside of the armature, FIG. 5 the sealing element arranged on the armature, and the centering element, FIG. 6 a section through part of the electric machine according to the invention, and FIG. 7 a method sequence of the method according to the invention.

Each electrical conductor 42 has two conductor ends 45. The conductor ends 45 project out of the armature 10. A first conductor portion 44 adjoins the conductor ends 45 in each case. By way of example, six conductor ends 45a to 45f are shown in FIGS. 1 and 2. The conductor ends 45a and 45d are part of a conductor 42. The conductor ends 45b and 45e are part of a conductor 42. The conductor ends 45c and 45f are part of a conductor 42.

The parts of the conductor 42 which, wound around at least one tooth 20, form at least one winding 40 adjoin the first conductor portion 44.

The electric machine 1 according to the invention furthermore has an insulating element 50. The insulating element 50 is arranged on the armature 10. The insulating element 50 has a guide means 52 at least in one groove 30. The guide means 52 serves for guiding the first conductor portion 44 within the armature. The guidance of the first conductor portion 44 takes place as a result of the arrangement within the guide means 52.

According to a further development, the insulating element 50 extends on at least one tooth 20.

The insulating element 50 is generated in particular by spraying an electrically insulating material onto the armature 10. The insulating element 50 can furthermore be formed by one element, or multiple elements, which is arranged, in particular fixed, on the armature 10 in the axial direction of the electric machine. The insulating element 50 can furthermore be composed of multiple parts. The insulating element 50 is made from plastics material or resin, for example.

The axial direction of the electric machine 1 corresponds to the longitudinal direction of the electric machine 1. The axial direction of the electric motor 1 extends parallel to the shaft 3 or the arbor of the electric machine 1.

FIG. 2 shows the side of the armature 10 which is directed towards the housing element 5 in the assembled state. Each groove 30 has a groove base 32. The groove 30 extends from the outer circumference of the armature 10 to the groove base 32. The groove base 32 is partially formed by the outer circumference of the armature base body 18. Two guide means 52 are formed within the groove 30, in particular in the region of the groove base 32.

The guide means 52 each have a guide means groove 54 and a spacer 56. A guide means 52 separates a first conductor portion 44 from further conductors 42 or from further parts of the conductor 42 with the aid of the spacer 56. The guide means 52, in particular the spacer 56, separates the conductor portion 44 from the further part of the conductor 42. The spacer 56 also separates the first conductor portion 44 within the guide means 52 from further first conductor portions 44.

The length, in particular the length in the circumferential direction of the armature 10, of the spacer 56 corresponds at least to the thickness of the windings 40 within a groove 30. A corresponding design prevents parts of the winding 40 from sliding into the guide means groove 54.

The guide means grooves 54 have an opening. The openings of the guide means grooves 54, or the openings of the guide means 52, which are located within a groove 30, are, in particular substantially, facing one another. The opening of the guide means extends over the entire length of the guide means 52. The guide means 52 or the guide means grooves 54 extend in particular in the longitudinal direction of the armature 10. The guide means 52 guide the first conductor portion 44 in the axial direction of the armature 10.

An optional clamping element 80 is shown by way of example in FIG. 1. The clamping element 80 is substantially annular in form. The annular region ensures that the part of the winding wires 42 which adjoins the first winding conductor portion 44 and which extends parallel to the surface of the base element 81 on the tooth is fixed axially.

The clamping element 80 has a pressure means. The pressure means extends in the radial direction, at least over part of the circumferential surface of the base element. The pressure means contacts part of the windings in the region of the groove base 32. It prevents an axial displacement of the first winding conductor 44 in that it forms a stop. It is preferably connected to a base element of the clamping element 80, in particular via radially formed webs. The pressure means is formed in the region of the base element which lies opposite the conductor ends 45a to 45f which are led out axially. As the conductor ends 45 are led through the through-openings 67 and 72, it prevents an axial displacement of the first winding conductor portion 44 within the guide means 52.

At least one clamping foot 82 is formed on the clamping element 80. The clamping foot 82 has a free end which is inserted between the guide element 52. The clamping feet 82 are formed at a spacing from one another in the circumferential direction. When the conductor ends 45 are led through the through-openings 67 and 72, the clamping feet prevent the conductor portions 44 from being pressed out of the guide means grooves 54.

At least one arresting means 88 is furthermore formed on the clamping element 80. The arresting means 88 are formed such that, after assembly, they produce a releasable connection, in particular a releasable latching connection, to the armature 10, in particular to the insulating element 50.

Figure 3:
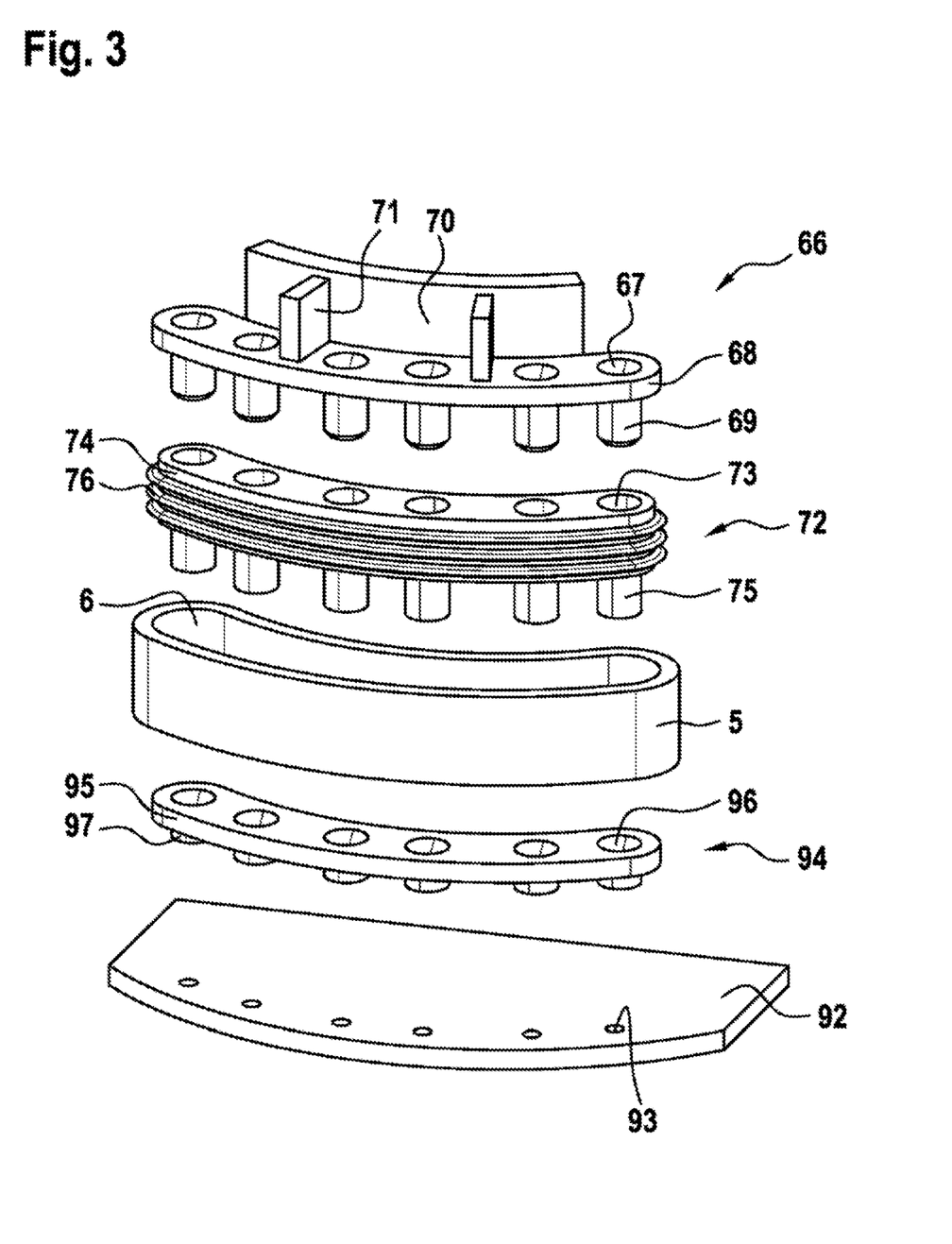

The first centering element 66, the sealing element 72, the optional second centering element 76, the printed circuit board 92 and an exemplary section of the housing element 5 are illustrated in FIG. 3. The centering element 66 comprises a base body 68. The base body 68 has a curvature. The curvature of the base body 68 corresponds to the curvature of the base body 18 of the armature 10. The curvature of the base body 68 of the centering element 66 is banana shaped. The centering element 66 has the shape of an annular segment. The curvature of the base body 68 preferably corresponds to the curvature of the armature 10 with the same radial spacing from the shaft 3. The first centering element 66 has at least one through-opening 67. In particular, the centering element 66 has a through-opening 67 for each conductor portion 45 which is guided out of the armature 10. For example, the first centering element 66 according to FIG. 4 has six through-openings 67. Centering means 69 are formed perpendicularly to the surface of the centering element 66. The through-openings 67 of the centering element 66 each extend through one of the centering means 69. The centering means 69 have in particular a tubular region. The centering means have a conical form at their free end. The conical form enables simplified introduction of the centering means 69 into a through-opening 73 of the sealing element 72. The centering means 69 are formed on the side of the centering element 67 which is opposite the armature 10.

The centering means 66 has a first aligning means 70. The first aligning means 70 extends in the axial direction over a section along the outer circumference of the base body 68 of the centering element 66. In particular, the first aligning means 70 extends along the outer circumference of the base body 68 which is directed towards the shaft 3 of the electric machine 1 after assembly. In particular, the first aligning means extends over at least four through-openings 67 of the centering element 66.

Second aligning means 71 are formed axially on the base element 68. Two second aligning means 71 are preferably formed. The two second aligning means 71 are arranged on that side of the base body 68 of the centering element 66 which lies opposite the centering means 69. The second aligning means 71 are in particular quadratic in form. The second aligning means 71 are arranged with a first circumferential surface on the base body 68. The second aligning means are arranged with a second circumferential surface, which is perpendicular to the first circumferential surface, on the first aligning means 70. The aligning means 70, 71 prevent a movement of the centering element 66 in the circumferential direction or in the radial direction relative to the armature 10. The centering means can have any number of aligning means 71. By way of example, the centering means 66 according to FIG. 1 has four second aligning means 71.

The centering element 66 is formed in particular in one piece.

The sealing element 72 has through-openings 73. For example, the sealing element 72 has six through-openings 73. The sealing element 72 furthermore has a base body 74. The base body 74 has a curvature. The curvature of the base body 74 of the sealing element 72 corresponds to the curvature of the first centering element 66. Sealing means 75 are formed on the sealing element 72 in the axial direction. The sealing means 75 are formed on the side of the sealing element 72 which is remote from the armature 10. The through-opening 73 of the sealing element 72 extends through the sealing means 75. At least one sealing lip 76 is formed on the outer circumference of the base body 72. In particular three sealing lips 76 are formed on the outer circumference. The sealing lips 76 extend over the entire outer circumference. The base body 74 of the sealing element 72 has at least one fully circumferential sealing lip 76. The sealing lips 76 are arranged at a spacing from one another in the axial direction.

The housing element 5 has a through-hole 6. The housing element 5 is illustrated in a simplified manner in FIG. 4. The sealing element 5 is placed within the through-hole 6 of the housing element 5 after assembly.

A second centering element 94 is furthermore provided. The second centering element 94 has a base body 95, wherein the base body 95 is formed identically to the base body 68 of the first centering element 66. The base body 95 of the second centering element 94 has a curvature. The curvature of the base body 95 of the second centering element 94 corresponds to the curvature of the base body 68 of the first centering element 66. Centering means 97 are formed on the base body of the second centering element 94. The through-openings 96 extend through the base body 95 and the centering means 97.

A printed circuit board 92 serves for electrically controlling the electric machine 1. The printed circuit board has solder bores 93.

Figure 4:
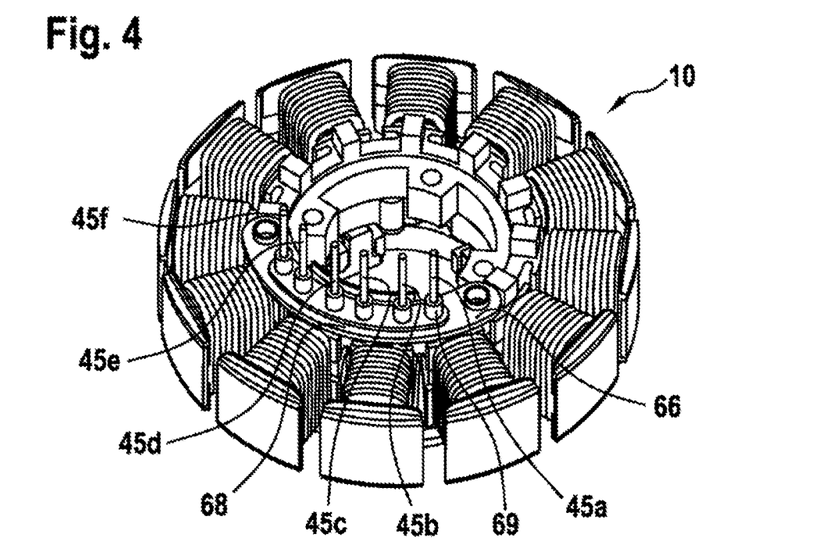

The underside of the armature 10, as already shown in FIG. 2, is shown in FIG. 4. The first centering element 66 is arranged on the armature 10. The first centering element is arranged according to FIG. 1 by way of example. However, the first centering element can also be arranged according to FIG. 4. In the arrangement, the conductor ends 45 are guided through the through-openings 67 of the first centering element 66. The centering means 69 of the centering element 66 bring about a centering and alignment of the conductor ends 45 in the axial direction of the electric machine 1. The centering element 66 enables simple simultaneous centering of a plurality of conductor ends 45 of the electrical conductor 42, for example.

Figure 5:
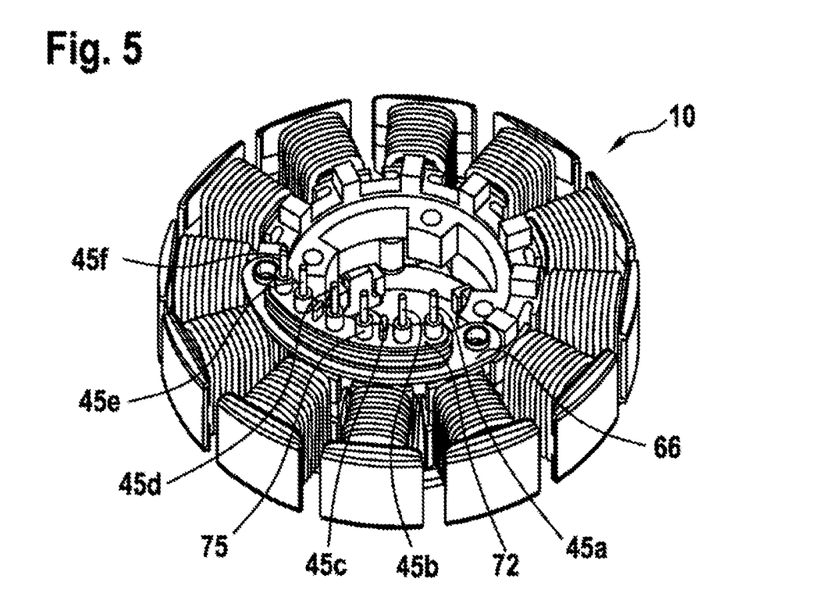

In FIG. 5, the sealing element 72 is arranged on the centering element 66 and the armature 10. The centering means 69 of the centering element 66 are inserted into the through-opening 73 of the sealing element 72. The centering means 69 bring about a centered guidance of the second conductor portion 45 through the through-hole 73 of the sealing element 72. The centering means 69 of the centering element 66 brings about simple introduction or simple leading-through of the conductor ends 45 through the through-openings 73 of the sealing element 72.

Figure 6:
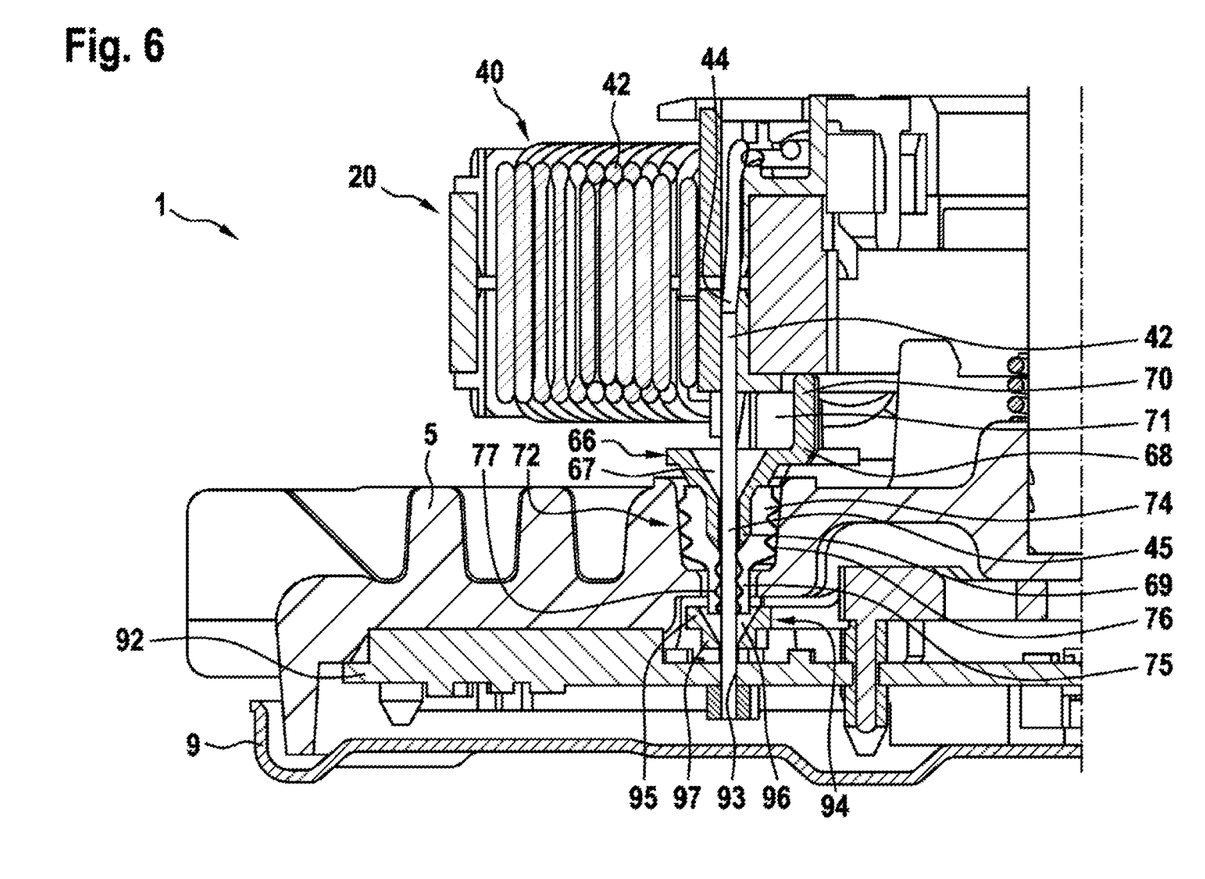

FIG. 6 shows a section through the electric machine 1. It reveals how the electrical conductor 42 forms a winding 40. The conductor 42 is furthermore guided within the guide means groove 54 as a first conductor portion 44. The conductor end 45 adjoins the first conductor portion 44. The conductor end 45 and the first conductor portion 44 are part of the electrical conductor 42. The conductor end 45 extends through the through-hole 67 of the first centering element 66, the through-hole 73 of the sealing element 72 and the through-hole 96 of the second centering element 94.

The through-hole 67 of the first centering element 66 has a funnel-shaped region. Part of the funnel-shaped region is formed within the centering means 69 of the centering element 66. The through-opening 67 has a circular inlet. Simplified introduction of the conductor end 45 into the through-hole 67, and therefore into the first centering element 66, is achieved as a result of the funnel-shaped form of the through-opening 67. In the region of the centering means 69, the through-opening 67 has only a slightly greater diameter than the diameter of the conductor end 45. Improved guidance, and therefore a centering, of the conductor end 45 is therefore enabled. The conductor end 45 is aligned radially as the conductor end 45 is introduced into the centering means.

The centering enables the sealing element 72 to be pushed on and attached in a simple manner.

The through-opening 73 of the sealing element 72 has a funnel-shaped region. The through-opening 73 of the sealing element 72 furthermore has a first radius and a second radius. The first radius is substantially the radius of the centering means 69 of the centering element 66. The second radius is smaller than the first radius. The second radius corresponds substantially to the radius of the conductor 42. The transition from the region with the first radius to the region with the second radius takes place by means of a frustoconical chamfered portion.

The sealing element 72 has at least one second sealing lip 77 along an inner circumference of the through-hole 73. In particular, the sealing element has two sealing lips 77. The second sealing lips 77 contact the conductor 42. The second sealing lips 77 prevent a through-flow of fluid along the electrical conductor 42. The first sealing lips 76 prevent a through-flow through the through-opening 6 of the housing element 5. The second sealing lips 77 are formed at a certain axial spacing from one another.

The sealing lips 76 on the base body 74 of the sealing element 72 are at an axial spacing from the sealing lips 77 in the circumferential direction of the through-opening 73 of the sealing element. The first centering element 66 and the second centering element 94 or the armature 10 and printed circuit board 92 can have a large radial offset from one another. If the sealing lips 76 on the outside of the sealing element 72 and the inner sealing lips 77 are located axially on the same plane, this can lead to unilateral pressure on the sealing lips 76, 77. With a large radial offset, this can lead to defects in the leak-tightness. Tolerances are compensated by the mutual axial spacing of the inner sealing lips 77 and outer sealing lips 76. The seal is elastic and adapts to the through-opening 6 of the housing 5. In the region of the inner sealing lips 77, the seal adapts to the position of the electrical conductor 42.

The second centering element 94 has a funnel-shaped through-opening 96. The funnel-shaped through-hole 96 enables the simplified introduction and leading-through of the conductor 45. The diameter of the through-opening 96 in the region of the centering means 97 is only minimally greater than the diameter of the electrical conductor 42. It is thus achieved that the second centering element 94 aligns the electrical conductor. The alignment brings about that the ends of the electrical conductor 42 can be introduced precisely into solder bores 93 of the printed circuit board 92. After the introduction of the electrical conductor 42 into the solder bore 93 of the printed circuit board 92, these can be soldered to one another.

The centering element 66 presses against the sealing element 72.

A housing element 9 forms a housing together with the housing element 5. In particular, the electronics or printed circuit board 92 are arranged in the housing. The interior, in which the printed circuit board 92 is arranged, is protected against fluids from the environment by the sealing element 72.

Figure 7:
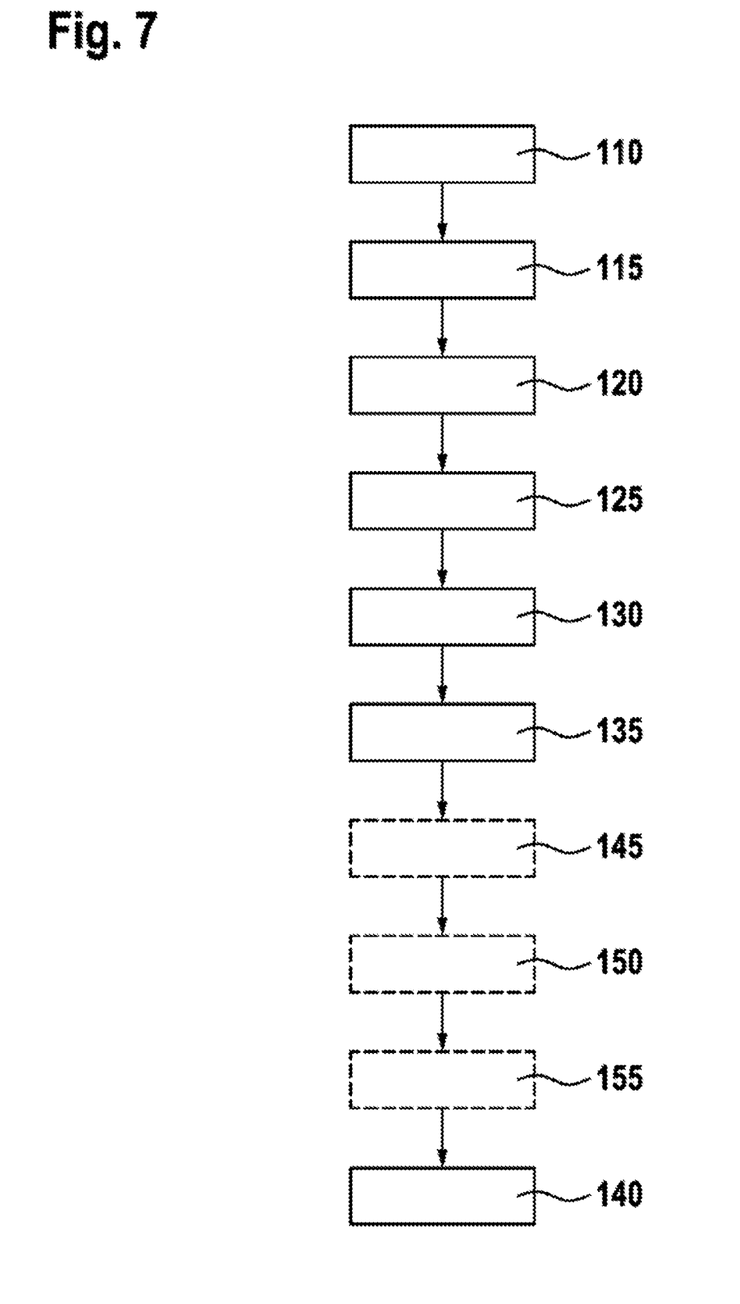

A method 100 according to the invention is illustrated in FIG. 7. The method 100 according to the invention serves for establishing electrical contact between a winding and a printed circuit board 92 of an electric machine 1. The method 100 according to the invention comprises a plurality of individual method steps, which are listed below. The sequence of the listed method steps can be changed here. Individual method steps can also be omitted.

One method step 110 comprises leading out the conductor ends 45 of the electrical conductor 42. The conductor ends 45 are guided out of the electric machine 1, or the armature 10, in the axial direction of the electric machine. FIG. 2 shows a corresponding armature 10 from which the conductor ends 45a to 45f are led out axially.

A further method step 115 comprises shortening the conductor ends 45 to the same length. In this case, the conductor ends 45 which project out of the armature 10 are shortened to substantially the same length. The shortening takes place in particular by means of a separating process, preferably laser cutting, pinching-off, cutting-off.

A further method step 120 comprises leading the conductor ends 45 through a respective through-opening 67 of the centering element 66. The centering element 66 has a through-opening 67 for each of the conductor ends 45. In the method step, all conductor ends 45 are simultaneously guided through a respective through-opening 67 of the centering element 66. As the conductor ends 45 are led through, the centering means 69 of the centering element 66 result in a parallel alignment and centering of the individual conductor ends 45 with respect to one another. The conductor ends 45 are furthermore aligned radially relative to the shaft 3. The leading-through of the conductor ends 45 through the through-openings 67 of the centering element 66 takes place as a result of arranging the centering element 66 on the armature 10, in particular in the axial direction. The centering element 66 is preferably moved in towards the armature 10. In this case, it must simply be ensured that the conductor ends 45 are introduced into the through-openings 67 of the centering element 66.

FIG. 4 shows an armature 10 on which the centering element 66 has been arranged. It furthermore shows how the conductor ends 42a to 42f are aligned in parallel with one another. The conductor ends 45, which extend through a centering means 69, are aligned centered with respect to one another. After they are led through the centering element 66, the conductor ends 45 project out of this. The conductor ends 45 project out of the centering element 66 on its side which is remote from the armature 10. As a result of its centering and its guidance, the centering element 66 enables simple introduction of the conductor ends 45 into the through-openings of the sealing element 72.

In a further method step 125, the conductor ends 45 are each guided through one of the through-openings of the sealing element 72. As the conductor ends 45 are led through, the centering element 66 has already aligned them so that simple leading-through of the conductor ends through the sealing element 72 is possible. After they are led through the sealing element 72, the conductor ends 45 project out of this. In this case, the conductor ends 45 are pushed through the through-opening 73 of the sealing element 72. The centering by the centering element 66, in particular the centering means 69, brings about that the conductor ends 45 can be pushed, in particular guided, centrally, or in a centered manner, through the through-opening 73 of the sealing element 72.

The centering element 66 is fixed in place with the aid of the aligning means 70 and 71 and means formed in a corresponding manner on the armature 10. A movement in the circumferential direction or in the radial direction is no longer possible.

A further method step 130 comprises introducing the centering means 69 of the centering element 66 into the through-openings 73 of the sealing element 72. In particular, the centering means 69 are not led through in this case, which means that they do not emerge or project on the other side of the sealing element. The centering means 69 are introduced merely partially or fully into the through-opening 73 of the sealing element 72. Each centering means 69 is introduced into a separate through-opening 73 of the sealing element 72. The method steps 110, 115, 120, 125 and 130 have been carried out in FIG. 5. The sealing element 72 abuts against the centering element 66, which abuts against the armature 10. The sealing element 72 prevents fluids from flowing through the through-openings 73 of the sealing element 72, in particular with the aid of its sealing means 75.

The centering means 69 introduced into the through-openings 73 of the sealing element 72 fix the sealing element 72 on the centering element 66.

In a further method step 135, the sealing element 72 is arranged within the through-opening 6 of the housing element 5. To this end, the sealing element 72 is inserted axially into the through-opening 6. As a result of the sealing element 72 abutting against the centering element 66, the sealing element 66 is prevented from rotating or tilting as it is introduced into the through-opening 6 of the housing element 5. The centering element 66 guides the sealing element 72 as the sealing element 72 is introduced into the through-opening 6 of the housing element 5.

In a further step 140, the electrical contact between the conductor ends 45 and the printed circuit board 92 is established. To this end, the printed circuit board 92 preferably has conductor bores 93. According to FIG. 3, the conductor bores 93 are formed merely as cutouts in the surface of the printed circuit board 92. According to a further development corresponding to FIG. 6, the conductor end is guided through a continuous conductor bore 93 of the printed circuit board 92. The conductor ends are then electrically contacted by the printed circuit board 92 on the sides of the printed circuit board 92 which are remote from the armature 10.

The electrical contact between the conductor ends 45 and the printed circuit board 92 is established by soldering, in particular soft soldering. Soft soldering has a process temperature below 450° C. During soldering, adhesive bonding takes place between the materials of the conductor ends 45 and the printed circuit board 92, in particular the conductors of the printed circuit board 92. To this end, solder is melted or the solder is produced by diffusion at the interfaces of the conductor ends 45 and the printed circuit board 92. During soldering, a surface alloy is generated without deep fusing of the printed circuit board 92 or the conductor ends 45. A selective soldering process, which is a variant of wave soldering, is used. In selective soldering, it is not the entire assembly which is soldered, but only a small part by means of a "miniature wave". All line ends 45 are preferably connected to the printed circuit board 92 simultaneously by means of multiple miniature waves. Accordingly, a soldering device is used, which can generate multiple miniature waves or a multi-wave which consists of multiple miniature waves. Soldering can furthermore also be carried out by manual soldering, laser soldering or inductive soldering.

A special alloy of the solder can preferably be used. In particular lead-free solder or InnoLot can be used. Solder alloys based on the Standards DIN EN ISO 9453 and DIN EN ISO 3677 are preferably used.

In a further optional method step 145, the insulation of the conductor ends 45 is at least partially removed. As a result of removing the insulation at the conductor ends 45, the wire carrying the electrical signals is exposed. The electrical contacting according to method step 140 can thus be carried out in a simplified manner. The insulation of the conductor ends 45 is removed by blades or laser. The removal takes place at the free ends of the conductor ends 45. It is also conceivable to fuse or burn the insulation in a partial area.

In a further method step 150, the armature 10 is attached to the housing element 5. The armature 10 is connected to the housing element 5 in particular by means of the screws 7. The method step 150 is preferably carried out simultaneously with the method step 135. In particular, both method steps take place during the bringing together of the armature 10 and the housing element 5.

In a further optional method step 155, the conductor ends 45 projecting out of the sealing element 72 are guided through a respective through-opening 96 of a second centering element 94. The centering means of the second centering element 94 bring about a parallel alignment of the line ends 45. In particular, this step is then necessary when the line ends 45 are no longer aligned axially as they are led through the sealing element 72. The second centering element 94 with its centering means 97 furthermore brings about a centering and parallel alignment of the line ends 45. The line ends 45, after they are led through the second centering element 94, project out of this.

The invention claimed is:

1. An electric machine (1) comprising:
at least one electrical conductor (42),
an armature (10) with a plurality of teeth, wherein at least one winding (40), which is formed by the electrical conductor (42), is formed on one of the teeth,
a centering element (66) with at least two through-openings (67) and
a sealing element (72) with at least two through-opening (73),
wherein the electrical conductor (42) has two conductor ends, which each extend through a through-opening (67, 73) of the centering element (66) and the sealing element (72), characterized in that
the centering element (66) has a base body (68) and at least two centering means (69), wherein each of the through-openings (67) of the centering element (69) extends through the base body (68) and one of the centering means (69), and
wherein the sealing element (72) has a base body (74) and at least two sealing means (75), wherein each of the through-openings (74) of the sealing element (72) extends through the base body (74) and one of the sealing means (75), and
wherein the centering means (69) are each arranged at least partially within one of the through-openings (67) of the sealing element (72),
wherein the conductor ends (45) extending through the sealing element (75) and the centering element (66) project out of the sealing element (75) and the centering element (66), and
wherein the conductor ends (45) are electrically connected to a printed circuit board (72) by soldering.

2. A method (100) for establishing electrical contact between a printed circuit board (92) and a winding (40) of an electric machine (1) as claimed in claim 1, wherein the electric machine (1) has an armature (10) with a plurality of teeth (20), wherein at least one winding (40), which is formed by an electrical conductor (42), is formed on one of the teeth (20), wherein the electrical conductor (42) has two conductor ends (45), wherein the method has the following steps:
leading (110) the conductor ends (45) of the electrical conductor (42) out of the armature (10) in an axial direction of the electric machine (1),
shortening (115) the conductor ends (45) to the same length,
leading (120) the conductor ends (45) through a respective through-opening (67) of a centering element (66), wherein the centering element (66) has a centering means (69) which centers the conductor ends (45) which are led through and aligns the conductor ends in parallel, wherein the conductor ends (45) which are led through emerge from the centering element (66),
leading (125) the conductor ends (45) through a respective through-opening (73) of a sealing element (72), wherein the conductor ends (45) which are led through emerge from the sealing element (72),
introducing (130) the centering means (69) into a respective through-opening (73) of a sealing element (72),
arranging (135) the sealing element (72) at least partially within a through-opening (6) of a housing element (5), and establishing electrical contact (140) between the conductor ends (45) and the printed circuit board (92).

3. The method (100) as claimed in claim 2, further comprising the step:
at least partially removing (145) insulation at the conductor ends (45).

4. The method (100) as claimed in claim 2, further comprising the step:
establishing electrical contact between the printed circuit board (92) and the conductor ends (45) by soft-soldering.

5. The method (100) as claimed in claim 2, further comprising the step:
attaching (150) the armature (10) to a housing element (5).

6. The method (100) as claimed in claim 2, further comprising the step:
leading the conductor ends through at least one respective sealing means (75) of the sealing element (72), through which the through-opening (73) of the sealing element (72) extends.

7. The method (100) as claimed in claim 2, further comprising the step:
leading (155) the conductor ends (45) through at least one respective through-opening (96) of a second centering element (94), wherein the second centering element (94) has a centering means (97), which centers the conductor ends (45) which are led through and aligns the conductor ends in parallel, wherein the conductor ends (45), after being led through, project out of the second centering element (94).

8. The method (100) as claimed in claim 2, further comprising the step:
at least partially removing (145) insulation at the conductor ends (45) by rotating blades or laser.

9. The method (100) as claimed in claim 2, further comprising the step:
establishing electrical contact between the printed circuit board (92) and the conductor ends (45) by soft-soldering, by means of a multi-wave process or by means of one of the following processes: mini-wave, manual soldering, laser soldering or inductive soldering.

10. The method (100) as claimed in claim 2, further comprising the step:
attaching (150) the armature (10) to a housing element (5) by means of a screw-fastening procedure.

11. The electric machine (1) as claimed in claim 1, characterized in that at least one of the through-openings (67) of the centering element (66) has a funnel-shaped region, wherein part of the funnel-shaped region of the through-openings (67) is formed within a centering means (75).

12. The electric machine (1) as claimed in claim 1, characterized in that at least one of the through-openings (73) of the sealing element (72) has a funnel-shaped region.

13. The electric machine (1) as claimed in claim 1, characterized in that a housing (5) with a through-opening (6) is provided, wherein the through-opening (6) is formed to correspond to an outer circumference of the sealing element (72).

14. The electric machine (1) as claimed in claim 1, characterized in that two guide means (52) are provided, which are formed such that the guide means direct the conductor ends (45) out of an armature (10) of the electric machine (1) in an axial direction.

15. The electric machine (1) as claimed in claim 1, characterized in that a second centering element (94) is provided, which has at least two through-openings (96), wherein each conductor end (45) extends in each case through one of the through-holes (96) of the second centering element (94).

16. An electric machine (1) as claimed in claim 1, characterized in that the printed circuit board (92) has a solder bore (93) for each conductor end (45), in which the conductor ends (45) are arranged and soldered.

17. A method (100) for establishing electrical contact between a printed circuit board (92) and a winding (40) of an electric machine (1) as claimed in claim claim 1, wherein the electric machine (1) has an armature (10) with a plurality of teeth (20), wherein at least one winding (40), which is formed by an electrical conductor (42), is formed on one of the teeth (20), wherein the electrical conductor (42) has two conductor ends (45), wherein the method has the following steps:
leading (110) the conductor ends (45) of the electrical conductor (42) out of the armature (10) in an axial direction of the electric machine (1),
leading (120) the conductor ends (45) through a respective through-opening (67) of a centering element (66), wherein the centering element (66) has a centering means (69) which centers the conductor ends (45) which are led through and aligns the conductor ends in parallel, wherein the conductor ends (45) which are led through emerge from the centering element (66),
leading (125) the conductor ends (45) through a respective through-opening (73) of a sealing element (72), wherein the conductor ends (45) which are led through emerge from the sealing element (72),
introducing (130) the centering means (69) into a respective through-opening (73) of a sealing element (72),
arranging (135) the sealing element (72) at least partially within a through-opening (6) of a housing element (5), and
establishing electrical contact (140) between the conductor ends (45) and the printed circuit board (92).

18. The method (100) as claimed in claim 17, further comprising the step:
at least partially removing (145) insulation at the conductor ends (45).

19. The method (100) as claimed in claim 17, further comprising the step:
establishing electrical contact between the printed circuit board (92) and the conductor ends (45) by soft-soldering.

20. The method (100) as claimed in claim 17, further comprising the step:
attaching (150) the armature (10) to a housing element (5).

21. The method (100) as claimed in claim 17, further comprising the step:
leading the conductor ends through at least one respective sealing means (75) of the sealing element (72), through which the through-opening (73) of the sealing element (72) extends.

22. The method (100) as claimed in claim 17, further comprising the step:
leading (155) the conductor ends (45) through at least one respective through-opening (96) of a second centering element (94), wherein the second centering element (94) has a centering means (97), which centers the conductor ends (45) which are led through and aligns the conductor ends in parallel, wherein the conductor ends (45), after being led through, project out of the second centering element (94).

23. The method (100) as claimed in claim 17, further comprising the step:
shortening (115) the conductor ends (45).

24. The electric machine (1) as claimed in claim 1 wherein the conductor ends (45) are electrically connected to a printed circuit board (72) by soldering at ends of the conductor ends.

25. The method (100) as claimed in claim 17, further comprising the step:
shortening (115) the conductor ends (45) to the same length.

26. The method (100) as claimed in claim 17, further comprising the step:
at least partially removing (145) insulation at the conductor ends (45) by rotating blades or laser.

27. The method (100) as claimed in claim 17, further comprising the step:
establishing electrical contact between the printed circuit board (92) and the conductor ends (45) by soft-soldering, by means of a multi-wave process or by means of one of the following processes: mini-wave, manual soldering, laser soldering or inductive soldering.

28. An electric machine (1) having
at least one electrical conductor (42),
an armature (10) with a plurality of teeth, wherein at least one winding (40), which is formed by the electrical conductor (42), is formed on one of the teeth,
a centering element (66) with at least two through-openings (67) and
a sealing element (72) with at least two through-openings (73),
wherein the electrical conductor (42) has two conductor ends, which each extend through one of the through-openings (67, 73) of the centering element (66) and the sealing element (72),
wherein the sealing element (72) has a base body (74) and at least two sealing means (75), wherein each of the through-openings (73) of the sealing element (72) extends through the base body (74) and one of the sealing means (75), and
wherein the conductor ends (45) extending through the sealing element (75) and the centering element (66) project out of these,
wherein the conductor ends (45) are electrically connected to a printed circuit board (92) by soldering, in particular at their ends,
wherein the centering element (66) has a base body (68) and at least two centering means (69), wherein each of the through-openings (67) of the centering element (66) extends through the base body (68) and one of the centering means (69), wherein the centering means (69) of the centering element (66) bring about a centering of the conductor ends (45) and an alignment of the conductor ends (45) in an axial direction, and
wherein the centering means (69) are each arranged at least partially within one of the through-openings (73) of the sealing element (72),
wherein the conductor ends (45) extending in the through-openings (73) of the sealing element (72) are guided by way of the centering means (69),
wherein at least one of the through-openings (67) of the centering element (66) has a funnel-shaped region, wherein part of the funnel-shaped region of the through-openings (67) is formed within a centering means (69), and
wherein at least one of the through-openings (73) of the sealing element (72) has a funnel-shaped region.

\* \* \* \* \*